United States Patent [19]

Krüger et al.

[11] Patent Number: 4,550,029

[45] Date of Patent: Oct. 29, 1985

[54] METHOD OF BOILING WORT

[75] Inventors: Roland Krüger, Dortmund; Klaus Ehrlinger, Fründenberg, both of Fed. Rep. of Germany

[73] Assignee: Holstein & Kappert GmbH, Dortmund, Fed. Rep. of Germany

[21] Appl. No.: 618,306

[22] Filed: Jun. 7, 1984

Related U.S. Application Data

[63] Continuation of Ser. No. 393,358, Jun. 29, 1982.

[30] Foreign Application Priority Data

Jul. 7, 1981 [DE]  Fed. Rep. of Germany ....... 3126714

[51] Int. Cl.$^4$ .......................... C12C 7/00; C12C 9/00; C12C 9/02
[52] U.S. Cl. ..................................... 426/487; 99/278; 426/29; 426/492
[58] Field of Search ................. 426/29, 487, 488, 490, 426/492, 476, 600; 99/278

[56] References Cited

U.S. PATENT DOCUMENTS

| | | | |
|---|---|---|---|
| 3,113,027 | 12/1963 | Learner et al. | 99/278 X |
| 3,378,374 | 4/1968 | Willamson et al. | 426/492 |
| 3,897,574 | 7/1975 | Pass | 426/488 X |
| 3,933,953 | 1/1976 | Leva | 426/488 |
| 4,376,109 | 3/1983 | Wolter et al. | 426/29 X |
| 4,388,857 | 6/1983 | Korek | 426/29 |

FOREIGN PATENT DOCUMENTS

| | | | |
|---|---|---|---|
| 2635026 | 9/1978 | Fed. Rep. of Germany | 426/29 |
| 136796 | 8/1979 | Fed. Rep. of Germany | 426/520 |
| 1051726 | 12/1966 | United Kingdom . | |
| 1383330 | 2/1975 | United Kingdom . | |

*Primary Examiner*—David M. Naff
*Attorney, Agent, or Firm*—Michael J. Striker

[57] ABSTRACT

Continuous pressure boiling of beer wort is carried out in a multistage column having an upright inner wall enclosing a head region near the top of the column, a sump region near the bottom of the column and a wort compartment between the head and sump regions. The wort compartment includes a plurality of superposed, substantially horizontal plates. Each plate is provided with an overflow weir on its upper surface with an opening between the overflow weir and the wall of the column. Regenerative preheated wort is charged onto an upper plate and flows downward from one plate to another over the overflow weirs and through the openings. A heated gaseous medium introduced into the sump region raises through the openings and heats the downward flowing wort to boiling temperature to degas and free the wort from undesirable foreign substances. Vapors from the wort are condensed in the head region and discharged, and the processed wort is discharged from the sump region.

3 Claims, 3 Drawing Figures

4,550,029

METHOD OF BOILING WORT

This application is a continuation of application Ser. No. 393,358 filed June 29, 1982.

BACKGROUND OF THE INVENTION

The present invention relates to a method of boiling wort, whereby the wort is subjected to a pre-heating process, and the invention also relates to a device which is suitable for carrying out this method.

Wort is conventionally boiled in ventilated wort boilers. In such case, the boiling time is approximately 1 to 2 hours, and the corresponding amount of steam for the pre-heating and boiling processes is approximately 15 to 20 kg per liter of wort. Part of this extremely high amount of thermal energy can in fact be recovered in specially installed boiler-type evaporation condensers and be used to produce hot water extraneous to the process. However, the production of such hot water substantially exceeds brewery requirements and has, therefore, to be stored temporarily prior to use. It is also known to subject the wort to high-temperature boiling. In such case, the wort is continuously heated to approx. 140° C. under pressure, kept at this temperature for approximately 3 minutes in a heat-retaining tube, and then released with partial evaporation. This provides a reduction in the otherwise conventional boiling time. The energy required for heating can, to a large extent, be reused regeneratively within the process, except during the discharge period.

A wort boiling process has to achieve the following objects:

On the one hand, the wort is to be "thermally stabilized", this term signifying sterilization, enzyme activation, protein coagulation, including fracture formation, and a number of other chemical reactions. In addition to the treatment temperature and the treatment duration, the movement of the wort and the formation of phase boundaries also affect the fracture formation and the subsequent beer stability.

On the other hand, volatile components which are extraneous to the beer aroma and undesirable are to be expelled during the boiling process.

During the boiling process, the wort is also concentrated by evaporation to the final concentration which is actually desired.

While the wort is being boiled, the hop substances are also removed. In such case, the extraction of the hop resins, the isomerization of the bitter acids and the subsequent decomposition and loss of individual components are significant. As well as the bitter substances, aromas are also to be removed.

SUMMARY OF THE INVENTION

On the basis of the above-mentioned methods, the present invention seeks to provide a method of boiling wort, whereby, on the one hand, further energy-saving can be achieved and, on the other hand, the above-mentioned criteria are fulfilled in a particularly advantageous manner.

According to the invention there is provided a method of boiling wort, whereby the wort is subjected to a pre-heating process and the pre-heated wort is continuously brought into direct contact with process steam in the form of an inert gas and/or steam in counterflow, the wort being heated to the required process temperature under pressure and being kept at this temperature for a predetermined period of time.

In addition to achieving further energy-saving because the inert gas and/or steam is repeatedly in contact with the wort, this method especially provides an advantageous movement of the wort by the formation of vapour bubbles. Because of desorption, volatile components which are extraneous to the beer aroma as well as being undesirable are simultaneously discharged. Because of the reduced oxygen content at the beginning of the boiling process, less oxidation, and hence a lower colour increase, are also achieved.

In such case, it has proved advantageous to use live steam as the process steam. However, within the scope of the invention, it is also conceivable to produce the process steam by evaporating the wort. Any desirable inert gas, or, for example, nitrogen or carbon dioxide, may also be used, however, as the process steam.

When the hops are added to the wort, two components are discernable, the easily soluble and volatile aroma substances and the substantially less soluble bitter substances which require a certain temperature and time influence for their isomerisation. Within the scope of the invention, therefore, it is proposed to pre-extract the hops with treated or partially treated wort in order to obtain aroma and to add this wort to the process again. In order to remove the bitter substances, the pre-extracted hops are accordingly added to the untreated and/or partially treated wort.

The device which is proposed to carry out the method according to the invention includes a plate column which acts as the treatment unit.

It is also proposed that the individual plates of the column are connected by means of tube connections having shut-off elements incorporated therein, the shut-off elements being adapted so as to be controllable in succession with a time lag in between. According to the invention, instead of the incorporated shut-off elements, each individual plate of the column may include an idling device which is also actuatable with a time lag in between.

The present invention will be further illustrated, by way of example, with reference to the accompanying drawings.

DESCRIPTION OF THE PREFERRED EMBODIMENT

Figure 1:
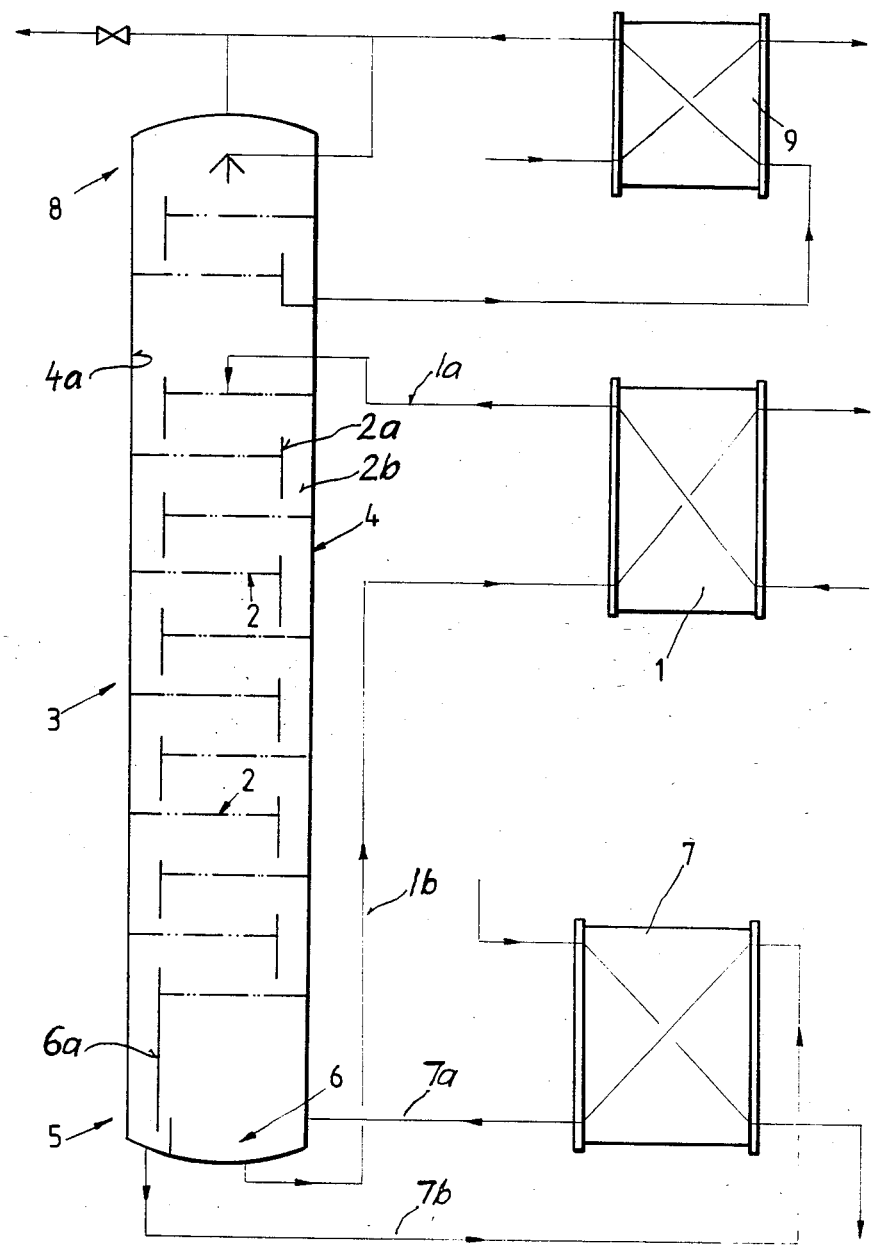
FIG. 1 is a schematic view of a column having associated heat exchangers.

According to the embodiment illustrated, the wort is preferably preheated regeneratively in a heat exchanger 1 and then passes a conduit 1a onto the upper plate 2 of a wort compartment 3 provided in a column 4 between a head region 8 and a sump region 6. The head region is near the top and the sump region is near the bottom of the column. The wort compartment includes a plurality of superposed horizontal plates 2, each containing an overflow weir 2a on its upper side and an opening 2b between the overflow weir and the inner wall 4a of the column for wort to flow downward from one plate to another. The wort during its descent is heated to process or boiling temperature by a partial condensation of rising steam or vapours as it will be described below.

A portion of the treated wort, located in discharge chute 5 of the lower must plate, is partially evaporated by means of circulation evaporator 7 communicating via conduit 7b with the chute 5 and via conduit 7a with the sump region of the column 4.

The remaining amount of treated wort passes, via an overflow weir 6a, into the column sump 6 which is designed as a vapour separator or remover. The processed wort is discharged from the sump region 6 through conduit 1b. If the amount of wort removed from the evaporator 7 through the conduit 7a is greater than the amount supplied from the lowermost plate through the conduit 7b, wort can flow backwards from the sump 6 into the overflow weir 6a and into the discharge chute 5. The level of liquid wort in the sump is regulated and is higher than the overflow weir 6a.

In order to prevent the evaporator from becoming coated at the envisaged process temperatures, pure live steam from the sump region 6 from a steam converter can also be used to operate the column.

The rising steam from the sump region 6 flows intensively through the wort as the wort flows downward from plate to plate and causes considerable movement of the wort and an intensive formation of vapour bubbles therein, thereby resulting in an advantageous fracture formation and stability of the beer. The wort is simultaneously heated to the aforementioned process temperature and kept in boiling condition for such a period of time until it is degassed by the rising flow of steam and is freed of undesirable foreign substances.

In an n-stage column, which is shown in the embodiment and in which the current of steam necessary for the desorption is used n times, the required amount of energy is mainly determined by the losses during the regenerative preheating process and by the losses in the steam or inert gas to be discharged, this amount of energy being therefore relatively small.

The steam or vapours necessary for the removal of inert gas is condensed in the head region 8 of the column 4 or is condensed externally in a mixing condenser. The energy being released may be used to heat serviceable water by means of heat exchanger 9. The inert gases are released into the atmosphere by a pressure valve or are supplied to a washer which is not shown in more detail. In such case, the pressure maintaining valve serves as a means for regulating the pressure, and hence the temperature, within the column 4.

Figure 3:
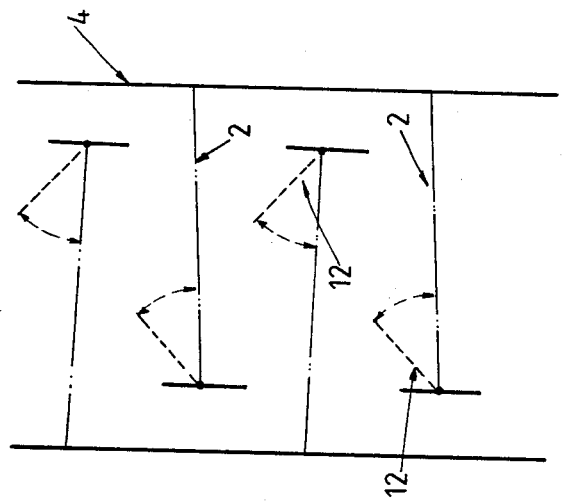
FIGS. 2 and 3 schematically show details of idling devices which may be utilized in the column of FIG. 1.
Figure 2:
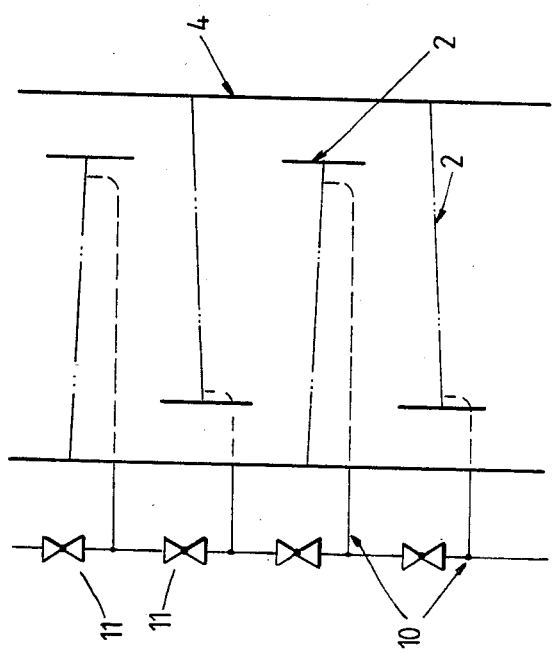

According to the embodiment illustrated in FIG. 2, the individual plates 2 of the column 4 are connected to a pipeline 10, and shut-off elements 11 are arranged in said pipeline 10. The shut-off elements 11 may be controlled in succession with a time lag in between. FIG. 3 shows a modification of FIG. 2 wherein idling devices 12 serve as the means for connecting the individual plates and may be designed as controllable valves. The individual valves may also be controlled in succession with a time lag in between.

The column 4 may therefore be emptied when a change of type is desired or in order to discharge the system. Control with a time lag ensures that the period for keeping all the partial streams of products hot both in the starting phase and in the discharging phase is kept constant.

While the N+1st plate idles during the type changeover, the N−1st plate is again filled with new wort or water. The heat itself is stored within the column, thereby preventing peaks of energy and coolant water during starting and discharging. By opening a number of valves 11 or valves 12 during the operation, it is possible, if required, to change and vary accordingly the throughflow period, and hence also the period for keeping the products hot.

The wort can be heated and cooled regeneratively by means of heat exchangers. If importance is attached to concentrating the wort, it is possible to flash the hot wort. The vapours may then be used also for the regenerative heating process.

What is claimed as new and desired to be protected by Letters Patent is set forth in the appended claims:

1. A method of continuous pressure-boiling of beer wort in a multistage column having an upright inner wall enclosing a head region near the top of the column, a sump region near the bottom of the column and a wort compartment between the head- and sump regions, the wort compartment including a plurality of superposed, substantially horizontal plates, each of the plates being provided with an overflow weir on its upper surface and with an opening between the overflow weir and the wall of the column, the plates communicating with each other and with the head- and sump regions via the openings to permit the wort to flow downward from plate to plate, the method comprising the steps of preheating the wort in a regenerative preheating process;

feeding a heated gaseous medium into the sump region to heat the column to a process temperature;

continuously charging the preheated wort onto an upper plate in the wort compartment to establish a downward flow of the wort from one plate to another over the overflow weirs and through the openings while the gaseous medium rises through the openings causing intensive movement and bubble formation in the wort;

heating the wort during its descent to a boiling temperature by partial condensation of the rising gaseous medium whereby the wort is kept in boiling condition for such a period of time until the gaseous medium degasses the wort and frees the same from undesirable foreign substances; condensing in the head region vapors emanating from the processed wort due to the action of the gaseous medium and discharging the condensed vapors from the head region and the processed wort from the sump region.

2. A method as claimed in claim 1 wherein the gaseous medium is live steam.

3. A method as claimed in claim 1 wherein the gaseous medium is innert gas.

* * * * *